United States Patent Office 2,850,475
Patented Sept. 2, 1958

2,850,475

COMPOSITIONS CONTAINING POLYEPOXY-POLYESTERS AND ALDEHYDE - AMIDE CONDENSATES AND METHOD OF MAKING SAME

Sylvan O. Greenlee, Racine, Wis., assignor to S. C. Johnson & Son, Inc., Racine, Wis.

No Drawing. Application May 27, 1955
Serial No. 511,749

19 Claims. (Cl. 260—45.3)

This invention relates to new compositions resulting from the reaction of polyepoxy-polyesters with condensates of aldehydes and amides, such as melamine, urea, and thiourea. The invention includes the initial reaction mixtures, as well as the intermediate and final reaction products derived therefrom. The polyepoxy-polyesters used in preparing these new compositions are the epoxidized polyesters which may be produced by epoxidizing the polyesters of tetrahydrophthalic acid and glycols. Reaction products derived from the reaction of these polyepoxy-polyesters and amide condensates are valuable compositions for use in the manufacture of films, molded articles, adhesives, coating compositions, etc.

An object of this invention is to produce new compositions containing polyepoxy-polyesters and condensates of aldehydes and amides such as urea, thiourea, and melamine in such proportions that they may undergo reaction to form more highly polymerized products.

Another object of this invention is to produce compositions of the hereinbefore described character wherein the compositions are prepared with a polyepoxy-polyester which may be selected so as to have a relatively high degree of epoxidation.

Still another object of this invention is to produce reaction products from the reaction of polyepoxy-polyesters and condensates of aldehydes and amides which are useful in the manufacture of films, molded articles, coating compositions, etc., and which may be prepared with such properties as having good chemical resistance, flexibility, and toughness.

The foregoing and other objects and advantages are attained by the present invention, various novel features of which will become more fully apparent from the following description, with particular reference to specific examples which are to be considered as illustrative only.

The polyepoxy-polyesters used in the preparation of the herein described compositions may be conveniently prepared by the epoxidation of the polyesters formed in the esterification of tetrahydrophthalic anhydride and glycols. The anhydride form of the acid is usually used since esterification proceeds easily with the anhydride, and since the anhydride is readily available commercially, although, of course, the acid itself could be used. The polyesters may also be prepared by the reaction between glycols and simple esters of tetrahydrophthalic acid such as dimethyl or diethyl esters. This latter reaction would involve alcoholysis, or the displacing of the ethyl or methyl alcohol by the appropriate glycol.

Glycols which may be used in the preparation of the polyesters include such glycols as ethylene glycol, diethylene glycol, tetramethylene glycol, pentamethylene glycol, phenyl ethylene glycol, and neopentyl glycol, as well as the longer-chain glycols, such as the 36-carbon glycol prepared by the sodium or catalytic reduction of the simple esters of dimerized 18-carbon soyabean oil acids. Due to the ease of dehydration under the conditions necessary for esterification, the primary and secondary glycols are the most satisfactory, since with the tertiary glycols, there is a tendency to remove the hydroxyl group and form an unsaturated bond.

By properly proportioning the concentration of tetrahydrophthalic anhydride and glycol in the esterification reaction, the degree of polymerization occurring during the polyester formation may be controlled. Any excess acidity or hydroxyl content present in the polyester reaction mixture may be neutralized by reaction with a monohydric alcohol or a monobasic acid, and by properly selecting these monofunctional reactants, slightly different properties may be given to the polyester composition formed in the esterification reaction.

The polyepoxy-polyesters may be prepared from these polyesters by epoxidizing the unsaturated portions of the tetrahydrophthalic acid residues in the polyester composition. The epoxidation of the polyesters, as well as the preparation of the polyester compositions, are more fully described in my copending application having Serial No. 503,323, filed April 22, 1955.

The number of epoxide groups per molecule and the molecular weight of the composition may be controlled by adjusting the degree of polymerization which takes place in the esterification reaction, controlling the extent of the epoxidation of the polyester, and by proper selection of the glycol used in the esterification reaction with tetrahydrophthalic acid. For instance, the epoxidized polymer formed by epoxidizing the polyester of a long-chain glycol and tetrahydrophthalic acid would have a lower degree of epoxidation per a given weight than the epoxidized polymer formed in the epoxidation of a polyester prepared with a shorter-chain glycol, and the molecular weight of each of these compositions may be controlled by regulating the degree of polymerization in the polyester formation. Polyepoxy-polyester compositions having up to 12 or more epoxide groups per molecule have been found to be useful in formulating the compositions herein described. The polyepoxy-polyester compositions used herein may have varying structures so long as they do not contain functional groups which interfere with the desired reaction of the polyepoxy-polyester and the aldehyde-amide condensate.

The aldehyde-amide condensates which are used herein for reacting with the polyepoxy-polyester compositions are condensates formed in the reaction of aldehydes, particularly formaldehyde, with ureas, thioureas, and melamines. These amides, it is known, will condense with aldehydes to form aldehyde-amide condensates. Thus urea, thiourea, and various substituted ureas and thioureas will react with such aldehydes as formaldehyde to form a condensate product. Similarly, melamine and various substituted melamines will react with these aldehydes. Substituted ureas, thioureas, or melamines, such as those containing long-chain alkyl groups, may be advantageously used to yield products which are more highly soluble in oil and hydrocarbon type compositions.

In the condensation of aldehydes with these amide compositions such as urea, thiourea and melamine, initially the reaction appears to be the addition of the aldehyde to the amide group in the composition to form primarily intermediate alkylol compounds. These compounds will further condense to form more resinous materials, the hydroxyl groups of the alkylol compounds reacting with other amide groups present. In the reaction between the amide group and the aldehyde, as well as in the reaction between the hydroxyl groups of the alkylol compounds with other amide groups, amidic hydrogen is removed from the nitrogen of the amide group, these amidic hydrogens being active hydrogens. Generally, therefore, in order that substituted amides will condense with aldehydes, it is necessary that the amides not be substituted to the extent that all of these active hydrogens are removed from the amides. Condensation products of aldehydes and active hydrogen-containing amides will contain active hydrogens, these active hydrogens including the hydrogen present in the hydroxyl groups formed in the condensation, as well as amidic hydrogen attached to nitrogen in the condensation products.

The degree of condensation of the aldehyde-amide may be varied so long as the reactants have not been condensed to a completely insoluble, infusible form. For instance, in the preparation of certain formulas, it may be advantageous to use the original alkylol form of the urea, thiourea, or melamine condensate which has been condensed very little and is in a syrupy, mobile state. In other instances, it may be desirable to partially condense the alkylol form to a harder resinous material.

Generally, viscosity and the molecular weight of the resulting condensate is a property depending upon the time of reaction, ratio of the reactants used, or type of catalyst used. Solubility characteristics of the condensate in the particular polyepoxy-polyester resin used will in general dictate the degree of condensation of the alkylol resin used in the reaction with the particular polyepoxy-polyester. The degree of condensation will also be determined by the viscosity desired in the reaction mixture of condensate and polyepoxy-polyester.

Many of the commercially available resins prepared by the condensation of aldehydes with amides of the type herein described are prepared in the presence of alcohol or other solvents which actually take part in the reaction and become part of the resulting resin composition. This may be illustrated by the melamine resins prepared in the presence of butyl alcohol. With these resins, the butyl alcohol to some extent condenses with the alkylol groups of the condensate to give an ether residue as part of the final condensate composition. Such modified products may be advantageously used in the herein described invention to give slightly modified products.

The aldehyde-amide condensates used in this invention may be a heat-converting type or they may be a permanently fusible type. In both instances, insoluble, infusible products may be obtained in the reaction with the polyepoxy-polyesters.

The reactions which take place between the polyepoxy-polyesters and the aldehyde condensates appear complex, and while it is desired not to be limited by an theoretical explanation of the mechanism of the reaction, it seems probable that the reaction is in part one between an epoxide group of the polyepoxide with active hydrogen attached to oxygen or nitrogen in the aldehyde condensate. The reaction may also include the further condensation of the aldehyde condensates present in the reaction mixture, as well as reaction between the epoxide groups of the polyepoxy-polyester with hydroxyl groups liberated in the polyepoxide in the course of the reaction of epoxide groups with active hydrogens. In the present invention, reaction of active hydrogen-containing compounds with polyepoxy-polyesters containing a relatively large number of epoxide groups per molecule, as may be prepared by properly proportioning the reactants in the polyester formation, provides the opportunity for several linear chains to interact and produce a web-like or so called cross-linked insoluble, infusible structure.

In making the new compositions, the melamine-aldehyde condensate or the urea or thiourea aldehyde condensate and the polyepoxy-polyester resin may be used with each other in regulated proportions and without the addition of other constituents. Alternatively, however, admixtures can be prepared by including in the reaction mixtures filling and compounding materials, plasticizers, pigments, etc. The use of a plasticizer for instance, is advantageous in those instances where the final reaction products would otherwise be somewhat brittle.

These constituents which may be added to give somewhat varied reaction products may be inert type constituents, i. e., they may be free of functional groups as illustrated by such plasticizers as high-boiling esters which are compatible with the polyepoxy-polyester aldehyde mixture. These inert constituents may also be illustrated by the usual inert pigments used in the formulation of paints and enamels which may be admixed in the invention to produce valuable enamel compositions. These constituents, however, may contain some functional groups which by virtue of their functionality are carried chemically by the mixture. An example of the latter type of constituent may be illustrated by the epoxide derivatives of unsaturated esters which are by-products of the fat and vegetable oil industries. Such plasticizers, by virtue of their epoxide functionality, tend to react with the available active hydrogen in the aldehyde amide condensate and be carried into the final polymeric composition. Because of the low epoxide content per molecule of such plasticizers, however, reaction with these plasticizers would tend to terminate the polymerization reaction. The high degree of epoxidation which may be achieved in the polyepoxy-polyester used in the herein described invention permits the use of such constituents which co-convert with the aldehyde-amide condensate to form insoluble cross-linked structures which are novel compositions of this invention.

The method of blending the two different types of resins together will depend somewhat on their properties, for example, their softening points. It is often convenient to use a form of the aldehyde-amide condensate which is in a syrupy state, and therefore mixes readily with the epoxidized polyester resin. Many of the epoxidized polyester resin compositions are also soft, almost syrupy in texture, so that the mixtures are relatively easily made. In the case of higher melting resins and condensates, it is often necessary to melt the compositions and make the mixtures at temperatures considerably above room temperature. In the manufacture of molded objects, a molten combination of the resin along with a small amount of converting agent or catalyst could be charged directly into the mold. On the other hand, in the preparation of protective coatings, it is often desirable to dissolve all the constituents of the composition along with the converting agent that is to be used in a volatile solvent. The solvent solution can be adjusted to the proper nonvolatile content to give a conveniently working viscosity for the application intended.

In order to induce polymerization of the polyepoxide resins with the aldehyde-amide condensates, converting agents are sometimes used. These converting agents include certain Friedel-Crafts type catalysts, such as boron trifluoride, often referred to as Lewis acids. In order to control the reaction, latent type catalysts which liberate boron trifluoride on the application of heat may be advantageously used. Alternatively, polybasic acids, including their anhydrides, may be used. These acid materials are coupling agents containing active hydrogen which will take part in the reaction with the epoxy groups to give coupling. Typical of the active hydrogen coupling agents which may be used in this manner are maleic anhydride, phthalic anhydride, aconitic acid, and thiomalic acid. It is not necessary to use a converting agent in order to convert the compositions of this invention due to the fact that the epoxide groups may react with the active hydrogen contained by the amide groups and the hydroxyl groups present in the condensate, provided a sufficiently elevated temperature is used for the reaction.

It is sometimes desirable to partially react the mixtures of aldehyde-amide resins and epoxidized polyester resins before application. For example, one might start off with a syrupy mixture of the products and apply heat until the softening point was raised to well above room temperature. This mixture would then be dissolved in a solvent in order to prepare a protective coating formulation. Films prepared from such a system would be essentially tack-free on evaporation of the solvent, yet would be soluble and fusible at this stage. Further application of heat to the films would then convert them to an insoluble, infusible form.

The present invention therefore includes initial reaction mixtures of aldehyde-amide resins and polyepoxy-polyesters, intermediate reaction products of such mixtures containing intermediate reaction products, as well as final reaction products. Reaction mixtures containing a polyepoxy-polyester having a large number of epoxide groups per molecule may be reacted with other cross-linking agents having active hydrogen which are capable of reaction with an epoxide group to give a more complex product. As illustrated by the examples, compositions having outstanding physical properties, such as toughness and flexibility, and outstanding chemical properties, such as resistance to boiling water and alkali, may be prepared. Compositions of this invention are well suited for protective coating formulations as they may be prepared to give films having high resistance to oxidation, water and other chemicals.

The following examples will serve to further illustrate the invention; however, it should be understood that the invention is not intended to be limited thereby. In the examples, proportions are expressed as parts by weight unless otherwise indicated. The nonvolatile content of the polyesters and polyepoxy-polyesters was obtained by heating the material in a vacuum oven for 3 hours at a temperature of 150° C. In the case of the aldehyde condensates, the nonvolatile content was obtained by heating the material for 3 hours at 110° C.

Examples I, II, III and IV describe the production of formaldehyde condensates using urea, thiourea and melamine.

Example I

In a 3 liter, 3-neck flask provided with a mechanical agitator, a thermometer and a reflux condenser, a mixture of 378 parts of melamine, 840 parts of 37% aqueous formaldehyde, and 725 parts of n-butyl alcohol was refluxed with continuous agitation for a period of 30 minutes. A water trap was then placed in the distilling column between the flask and the reflux condenser and filled with toluene. The refluxing was continued until a total of 590 parts of water had removed from the reaction mixture. The product, amounting to 1342 parts, was a clear, water white, colorless, heavy, syrupy liquid.

Example II

In a 3-liter, 3-neck flask provided with a mechanical agitator, thermometer, and reflux condenser, a mixture of 120 parts of urea, 600 parts of 37% aqueous formaldehyde, and 1040 parts of n-butyl alcohol was refluxed with continuous agitation for a period of 1 hour. A water trap was then placed between the reflux condenser and flask and filled with toluene. Refluxing was continued until 340 parts of water were removed from the reaction mixture. The resulting mixture was cooled to room temperature and filtered to yield 1030 parts of a clear, water white, syrupy liquid.

Example III

A mixture of 304 parts of thiourea, 960 parts of 37% aqueous formaldehyde, and 800 parts of n-butyl alcohol was treated according to the procedure used in Example II, refluxing the mixture until 675 parts of water were removed, to give a final yield of 1214 parts of a clear, light amber, syrupy product.

Example IV

A mixture of 120 parts of urea, 148 parts of thiourea, 960 parts of 37% aqueous formaldehyde, and 800 parts of n-butyl alcohol was treated according to the procedure used in Example II, refluxing the mixture until 715 parts of water were removed, to give a final yield of 1175 parts of a clear, almost colorless, syrupy liquid.

Examples V, VI, and VII illustrate the production of polyesters which may be advantageously used in this invention.

Example V

A mixture of 1.1 mol tetrahydrophthalic anyhdride and 0.2 mol n-butanol was placed in a 3-neck flask provided with a thermometer, a mechanical agitator, and reflux condenser attached through a water trap. After melting the tetrahydrophthalic anhydride in the presence of the butanol, 1 mol of 1,4-butanediol was added. The reaction mixture was gradually heated with agitation to 225° C. at which point a sufficient amount of xylene was added to give refluxing at esterification temperature. The reaction mixture was then heated with continuous agitation at 225–235° C. until the acid value decreased to 8.6, a period of approximately 24 hours.

Acid value as herein described represents the number of milligrams of KOH equivalent to the acidity present in a one-gram sample. The product was a highly viscous, tacky material having slight flow at room temperature with a iodine value of 93.

Example VI

Using the same procedure as in Example V, a polyester resin was prepared from 3 mols of tetrahydrophthalic anhydride, 2 mols of ethylene glycol and 2 mols of n-butanol. The product had an iodine value of 100 and an acid value of 4.

Example VII

By the same procedure as in Example II, a polyester resin was prepared from 1.1 mols of tetrahydrophthalic anhydride, 1 mol of diethylene glycol and 0.2 mol of n-butanol. The product had an acid value of 3.9 and an iodine value of 101.

Examples VIII, IX, and X illustrate the epoxidation of the polyesters of Examples V, VI, and VII.

Example VIII

A dehydrated acid form of the cation exchange resin Dowex 50X–8 (50–100 mesh) was prepared. This Dow Chemical Company exchange resin is the sodium salt of a sulfonated styrene divinylbenzene copolymer containing about 8% divinylbenzene. The resin may be illustrated by the formula $RSO_3^-Na^+$, where R represents the hydrocarbon network of the copolymer. The acid form of the resin was prepared by washing the alkali salt form several times with 4 to 6 normal hydrochloric acid and finally washing the product with distilled water to remove excess mineral acid and inorganic salt. This product was then dehydrated by warming it in a vacuum oven at temperatures of about 80° C. for a period of 16 hours.

In a 3-neck flask provided with a thermometer, a mechanical agitator, and a reflux condenser was placed 107 parts of a dehydrated acid exchange resin and 30 parts glacial acetic acid. The mixture of cation exchange resin and acetic acid was allowed to stand until the resin had completely taken up the acid.

To this mixture was added 273 parts of the polyester resin of Example V. dissolved in an equal weight of xylene. To the continuously agitated reaction mixture was added dropwise over a period of 45 minutes to 1 hour 75 parts of 50% hydrogen peroxide. The reaction temperature was held at 60° C. requiring the application of some external heat until a milliliter sample of the reaction mixture analyzed less than 1 milliliter of 0.1 N sodium thiosulfate in an iodometric determination of hydrogen peroxide. In some preparations involving other polyester resins, sufficient exothermic heat is produced during the addition of hydrogen peroxide so that no external heat is required, or even some external cooling may be required.

The product was then filtered, finally pressing the cation exchange resin filter cake. The acid value of the total resin solution was 56.9.

A dehydrated basic form of the anion exchange resin Dowex 1 (20-50 mesh) was prepared. This Dow Chemical Company exchange resin is the quaternary ammonium chloride salt of an aminated styrene divinylbenzene copolymer containing about 8% divinylbenzene. The resin may be illustrated by the formula $RR'_3N^+Cl^-$ where R represents the hydrocarbon network and R' is a methyl group. The basic form of the resin was prepared by washing the salt form with sodium hydroxide followed by distilled water to remove excess alkali and mineral acid salt. The resin was then dried by warming it in a vacuum oven at a temperature of 80° C. for a period of about 16 hours.

The 559 parts of epoxide solution was thoroughly mixed with 175 parts of a dehydrated basic form of Dowex 1. The resulting mixture was then filtered followed by pressing as much of the solution as possible from the anion exchange resin cake. This product had an acid value of 10.1 on the nonvolatile resin content. The epoxide equivalent (number of parts resin containing one epoxide equivalent) was 304 on the nonvolatile resin content.

The epoxide values as discussed herein were determined by refluxing for 30 minutes a 2-gram sample of the epoxide composition with 50 milliliters of pyridine hydrochloride in excess pyridine. The pyridine hydrochloride solution was prepared by adding 20 milliliters of concentrated HCl to a liter of pyridine. After cooling to room temperature, the sample is then back-titrated with standard alcoholic sodium hydroxide.

This resin solution is satisfactory for many uses, such as blending with active hydrogen compositions to make coating resin solutions ready for application. In cases where the solvent-free resin is desired, the solvent may be readily removed by distillation, preferably at reduced pressure under conditions where the temperature does not rise above around 60° C.

*Example IX*

252 parts nonvolatile of the polyester resin of Example VI was epoxidized in accordance with the procedure given in Example III to give a product having an acid value of 6 on nonvolatile content and an epoxide equivalent on the nonvolatile content of 268.

*Example X*

250 parts nonvolatile of the polyester resin from Example VII was epoxidized in accordance with the procedure from Example VIII to give a product having an epoxide equivalent of 314 and an acid value of 13.2 on the nonvolatile content.

The following examples illustrate the production of new compositions from aldehyde condensates and polyepoxy-polyesters.

*Example XI*

A mixture of 304 parts of the nonvolatile product of Example VIII in an equal weight of xylene and 300 parts of the nonvolatile product of Example I in an equal weight of butanol using no converting agent gave hard, flexible films when cured at 175° C. for 30 minutes. These films withstood exposure to 5% sodium hydroxide solution for a period of 15 hours.

When a mixture was prepared reducing the amount of Example I to 82 parts of the nonvolatile product of Example I, similar results were obtained.

*Example XII*

A mixture of 304 parts of the nonvolatile product of Example VIII in an equal weight of xylene and 19 parts of the nonvolatile product of Example I in an equal weight of butanol was prepared including in the mixture 6 parts of boron trifluoride triethanolamine complex. Films prepared from this mixture were cured for 30 minutes at 175° C. These films withstood 2 hours exposure to boiling water or 80 hours exposure to 5% sodium hydroxide.

*Example XIII*

A mixture of 268 parts of the nonvolatile product of Example IX in an equal weight of xylene and 134 parts of the nonvolatile product of Example III in an equal weight of butanol was prepared including in the mixture 6 parts of boron trifluoride triethanolamine complex. Films prepared from this mixture were cured for 30 minutes at 175° C. to give hard, flexible films. These films withstood 7 hours exposure to 5% sodium hydroxide.

*Example XIV*

A mixture of 314 parts of the nonvolatile product of Example X in an equal weight of xylene and 79 parts of the nonvolatile product of Example I in an equal weight of butanol was prepared including in the mixture 50 parts of thiomalic acid. Films prepared from these mixtures were cured for 30 minutes at 150° C. and these films withstood 5 hours and resisted 5% alkali for 8 minutes.

Raising the curing temperature to 175° C. increased the alkali resistance to 45 minutes.

*Example XV*

A mixture of 304 parts of the nonvolatile product of Example VIII in an equal weight of xylene and 152 parts of the nonvolatile product of Example II in an equal weight of butanol using no converting agent gave hard flexible films which, when cured at 175° C. for 30 minutes, withstood 5% sodium hydroxide for a period of 15 hours, and boiling water for 30 minutes.

Similar result were obtained when the mixture was prepared replacing the amount of the solution of Example II with 82 parts of the nonvolatile product of Example I mixed in an equal weight of butanol.

*Example XVI*

Films prepared as in Example XV from the product of Example III and the product of Example VIII withstood 5% sodium hydroxide for a period of 15 hours, and boiling water for a period fo 30 minutes.

*Example XVII*

Films prepared as in Example XV form the product of Example IV and the product of Example VIII withstood 5% sodium hydroxide for a period of 15 hours, and boiling water for a period of 30 minutes.

*Example XVIII*

Films prepared from 314 parts of the nonvolatile product of Example X in an equal weight of xylene, 314 parts of the product of Example IV in an equal weight of butanol, and 6 parts of boron trifluoride-triethanolamine complex were cured for 30 minutes at 175° C. The resulting film showed no deterioration after 3 hours' exposure to boiling water and 34 hours exposure to 5% aqueous sodium hydroxide.

*Example XIX*

Films prepared as in Example XVIII using 304 parts of the nonvolatile product of Example VIII in an equal weight of xylene, 304 parts of the nonvolatile product of Example III, and 50 parts of thiomalic acid were cured for 30 minutes at 150° C. These films withstood 1 hour exposure to boiling water, or 9 hours' exposure to 5% sodium hydroxide.

In a similar manner, other compositions can be prepared using other polyepoxy-polyester compositions and aldehyde-amide condensates in various proportions. In general, excellent conversion products can be obtained using proportions of about 1 part polyepoxy-polyester resin to an equal amount of aldehyde condensate, to about 10 parts polyepoxy-polyester resin to 1 part aldehyde condensate.

Conversion was obtained without the use of converting agents, however, it was found that faster conversion under more moderate reaction conditions may be obtained using such converting agents as boron trifluoride type catalysts or active hydrogen containing coupling agents.

These compositions may be mixed with various other resins in preparing final reaction mixtures, and can also be conveniently mixed with fillers, pigments, plasticizers, or other constituents in order to give useful products. As discussed hereinbefore, these constituents may be the inert type, or they may be the kind which chemically unite with the composition. In view of the high degree of epoxidation which can be prepared in the polyepoxy-polyesters used in this invention, these compositions are particularly valuable for use with such constituents.

As used herein, "epoxy oxygen" refers to the —O— bridge in an epoxide composition typically illustrated by the following:

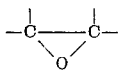

It should be appreciated that while there are above disclosed but a limited number of embodiments of this invention, it is possible to produce still other embodiments without departing from the inventive concept herein disclosed, and it is intended, therefore, to cover all modifications of the invention which would be apparent to one skilled in the art and that come within the scope of the appended claims.

It is claimed and desired to secure by Letters Patent:

1. Compositions useful for the production of complex reaction products comprising the polyepoxy-polyesters of tetrahydrophthalic acid and glycols, said polyesters containing epoxide groups formed by replacing one bond of the olefin linkage of tetrahydrophthalic acid with epoxy oxygen, and a fusible aldehyde-amide condensate, said condensate being prepared with active hydrogen-containing amides of the group consisting of urea, thio-urea, melamine, and alkyl substituted homologues thereof.

2. Compositions useful for the production of complex reaction products comprising the polyepoxy-polyesters of tetrahydrophthalic acid and glycols, said polyesters containing epoxide groups formed by replacing one bond of the olefin linkage of tetrahydrophthalic acid with epoxy oxygen, a fusible aldehyde-amide condensate, said condensate being prepared with active hydrogen-containing amides of the group consisting of urea, thio-urea, melamine, and alkyl substituted homologues thereof, and a converting agent of the group consisting of polycarboxylic acids, polycarboxylic acid anhydrides and boron trifluoride.

3. Compositions useful for the production of complex reaction products containing in substantial proportions the polyepoxy-polyesters of tetrahydrophthalic acid and glycols, said polyesters containing epoxide groups formed by replacing one bond of the olefin linkage of tetrahydrophthalic acid with epoxy oxygen, and a fusible formaldehyde-amide condensate, said condensate being prepared with active hydrogen-containing amides of the group consisting of urea, thiourea, melamine, and alkyl substituted homologues thereof, said compositions containing about from .10 to 1 part of said condensate to about 1 part of said polyepoxy-polyesters.

4. Compositions useful for the production of complex reaction products containing in substantial proportions the polyepoxy-polyesters of tetrahydrophthalic acid and glycols, said polyesters containing epoxide groups formed by replacing one bond of the olefin linkage of tetrahydrophthalic acid with epoxy oxygen, and a fusible formaldehyde-urea condensate.

5. Compositions useful for the production of complex reaction products containing in substantial proportions the polyepoxy-polyesters of tetrahydrophthalic acid and glycols, said polyesters containing epoxide groups formed by replacing one bond of the olefin linkage of tetrahydrophthalic acid with epoxy oxygen, and a fusible condensate of alcohol, formaldehyde, and urea, said compositions containing from about .10 to 1 part of said condensate to about 1 part of said polyepoxy-polyester.

6. The composition of claim 5 which also contains a converting agent of the group consisting of polycarboxylic acids, polycarboxylic acid anhydrides, and boron trifluoride.

7. Compositions useful for the production of complex reaction products containing in substantial proportions the polyepoxy-polyesters of tetrahydrophthalic acid and glycols, said polyesters containing epoxide groups formed by replacing one bond of the olefin linkage of tetrahydrophthalic acid with epoxy oxygen, and a fusible formaldehyde-thiourea condensate.

8. Compositions useful for the production of complex reaction products containing in substantial proportions the polyepoxy-polyesters of tetrahydrophthalic acid and glycols, said polyesters containing epoxide groups formed by replacing one bond of the olefin linkage of tetrahydrophthalic acid with epoxy oxygen, and a fusible condensate of alcohol, formaldehyde, and thiourea, said compositions containing from about .10 to 1 part of said condensate to about 1 part of said polyepoxy-polyester.

9. The compositions of claim 8 which also contain a converting agent of the group consisting of polycarboxylic acids, polycarboxylic acid anhydrides, and boron trifluoride.

10. Compositions useful for the production of complex reaction products containing in substantial proportions the polyepoxy-polyesters of tetrahydrophthalic acid and glycols, said polyesters containing epoxide groups formed by replacing one bond of the olefin linkage of tetrahydrophthalic acid with epoxy oxygen, and a fusible formaldehyde-melamine condensate.

11. Compositions useful for the production of complex reaction products containing in substantial proportions the polyepoxy-polyesters of tetrahydrophthalic acid and glycols, said polyesters containing epoxide groups formed by replacing one bond of the olefin linkage of tetrahydrophthalic acid with epoxy oxygen, and a fusible condensate of alcohol, formaldehyde, and melamine, said compositions containing from about .10 to 1 part of said condensate to about 1 part of said polyepoxy-polyester.

12. The compositions of claim 11 which also contain a converting agent of the group consisting of polycarboxylic acids, polycarboxylic acid anhydrides, and boron trifluoride.

13. Infusible compositions containing the reaction products of polyepoxy-polyesters of tetrahydrophthalic acid and glycols, said polyesters containing epoxide groups formed by replacing one bond of the olefin linkage of tetrahydrophthalic acid with epoxy oxygen, and a fusible condensate of alcohol, formaldehyde, and urea.

14. Infusible compositions containing the reaction products of polyepoxy-polyesters of tetrahydrophthalic acid and glycols, said polyesters containing epoxide groups formed by replacing one bond of the olefin linkage of tetrahydrophthalic acid with epoxy oxygen, and a fusible condensate of alcohol, formaldehyde, and thiourea.

15. Infusible compositions containing the reaction products of polyepoxy-polyesters of tetrahydrophthalic acid and glycols, said polyesters containing epoxide groups formed by replacing one bond of the olefin linkage of tetrahydrophthalic acid with epoxy oxygen, and a fusible condensate of alcohol, formaldehyde, and melamine.

16. A method of forming plastic compositions which comprises heating a solution of (a) a fusible aldehyde-amide condensate, said condensate being prepared with active hydrogen-containing amides of the group consisting of urea, thiourea, melamine, and alkyl substituted homologues thereof, and (b) a polyepoxy polyester of tetrahydrophthalic acid and a glycol, said polyester containing epoxide groups formed by replacing one bond of the olefin linkage of tetrahydrophthalic acid with epoxy oxygen, to form an infusible product.

17. A method of forming plastic compositions which comprises heating a solution of (a) a fusible aldehyde-amide condensate, said condensate being prepared with active hydrogen-containing amides of the group consisting of urea, thiourea, melamine, and alkyl substituted homologues thereof, (b) a polyepoxy polyester of tetrahydrophthalic acid and a glycol, said polyester containing epoxide groups formed by replacing one bond of the olefin linkage of tetrahydrophthalic acid with epoxy oxygen, and (c) a converting agent selected from the group consisting of polycarboxylic acids, polycarboxylic acid anhydrides, and boron trifluoride to form an infusible product.

18. The method of claim 17 wherein said mixture is heated at temperatures in excess of 150° C.

19. A method of forming plastic compositions which comprises heating a solution of a polyepoxy-polyester of tetrahydrophthalic acid and a glycol, said polyester containing epoxide groups formed by replacing one bond of the olefin linkage of tetrahydrophthalic acid with epoxy oxygen, and a fusible condensate of alcohol, formaldehyde, and active hydrogen-containing amides of the group consisting of urea, thiourea, melamine, and alkyl substituted homologues thereof, to form an infusible product.

References Cited in the file of this patent

UNITED STATES PATENTS

| | | |
|---|---|---|
| 2,528,359 | Greenlee | Oct. 31, 1950 |
| 2,591,539 | Greenlee | Apr. 1, 1952 |
| 2,660,563 | Banes et al. | Nov. 24, 1953 |
| 2,720,500 | Cody | Oct. 11, 1955 |